US012202265B2

(12) United States Patent
Sugioka et al.

(10) Patent No.: US 12,202,265 B2
(45) Date of Patent: Jan. 21, 2025

(54) HEAD, HEAD MODULE, AND APPARATUS THAT DISCHARGES LIQUID

(71) Applicants: Yuu Sugioka, Kanagawa (JP); Toshiaki Masuda, Kanagawa (JP); Kentaroh Yamanaka, Kanagawa (JP); Hitoshi Usami, Kanagawa (JP)

(72) Inventors: Yuu Sugioka, Kanagawa (JP); Toshiaki Masuda, Kanagawa (JP); Kentaroh Yamanaka, Kanagawa (JP); Hitoshi Usami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 107 days.

(21) Appl. No.: 17/972,880

(22) Filed: Oct. 25, 2022

(65) Prior Publication Data

US 2023/0141751 A1 May 11, 2023

(30) Foreign Application Priority Data

Nov. 10, 2021 (JP) ................................ 2021-183763

(51) Int. Cl.
*B41J 2/14* (2006.01)

(52) U.S. Cl.
CPC .. *B41J 2/14201* (2013.01); *B41J 2002/14491* (2013.01)

(58) Field of Classification Search
CPC .......... B41J 2/14233; B41J 2002/14491; B41J 2/1623; B41J 2/14201; B41J 2002/14362; B41J 2202/20; B41J 2202/21; B41J 2202/19; B41J 2/161; B41J 2/1635; B41J 2002/14241; B41J 2/04541; B41J 2/1607; B41J 2/14072
See application file for complete search history.

(56) References Cited

U.S. PATENT DOCUMENTS

2008/0210935 A1 9/2008 Ebara
2009/0272973 A1 11/2009 Yoshida et al.
2015/0015632 A1* 1/2015 Sakurai ................ B41J 2/14129 347/14
2020/0298566 A1 9/2020 Sugioka

FOREIGN PATENT DOCUMENTS

JP 2007-157809 6/2007
JP 2007-189111 7/2007
JP 2007-234933 9/2007
JP 2016-221703 12/2016

* cited by examiner

*Primary Examiner* — Jannelle M Lebron
(74) *Attorney, Agent, or Firm* — XSENSUS LLP

(57) ABSTRACT

A head includes: a silicon substrate; an insulating film on the silicon substrate; an electrode wiring on the insulating film; a flexible wiring connected to the electrode wiring; and a conductive film electrically connects the flexible wiring and the electrode wiring in a bonding area. The silicon substrate has an exposed area on a surface of the silicon substrate facing the insulating film, and the exposed area is in a vicinity of the bonding area and is exposed from the insulating film.

10 Claims, 8 Drawing Sheets

COMPARATIVE EXAMPLE 1

HEAD, HEAD MODULE, AND APPARATUS THAT DISCHARGES LIQUID

CROSS-REFERENCE TO RELATED APPLICATIONS

This patent application is based on and claims priority pursuant to 35 U.S.C. § 119(a) to Japanese Patent Application No. 2021-183763, filed on Nov. 10, 2021, in the Japan Patent Office, the entire disclosure of which is hereby incorporated by reference herein.

BACKGROUND

Technical Field

The present embodiments relate to a head, a head module, and an apparatus that discharges liquid.

Related Art

A head, such as a liquid discharge head, includes an electrode of a drive element that pressurizes a pressure chamber bonded to a wiring with a conductive film, such as an anisotropic conductive film (ACF), to be electrically connected.

The head includes a $SiO_2$ diaphragm plate with a piezoelectric element integrally formed on a silicon substrate that serves as a channel plate, an electrode wiring leading to an electrode of the piezoelectric element on the diaphragm plate, and a flexible wiring connected to the electrode wiring with an ACF.

SUMMARY

A head includes: a silicon substrate; an insulating film on the silicon substrate; an electrode wiring on the insulating film; a flexible wiring connected to the electrode wiring; and a conductive film electrically connects the flexible wiring and the electrode wiring in a bonding area. The silicon substrate has an exposed area on a surface of the silicon substrate facing the insulating film, and the exposed area is in a vicinity of the bonding area and is exposed from the insulating film.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
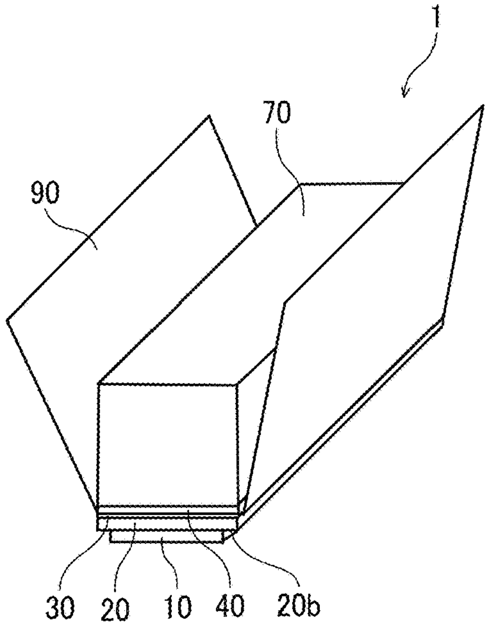
FIG. 1 is an explanatory diagram for a perspective view of a head according to the first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure are explained with reference to the accompanying drawings. The first embodiment of the present disclosure is explained with reference to FIG. 1 through FIG. 3.

FIG. 1 is an explanatory diagram for a perspective view of a head according to the present embodiment.

Figure 2:
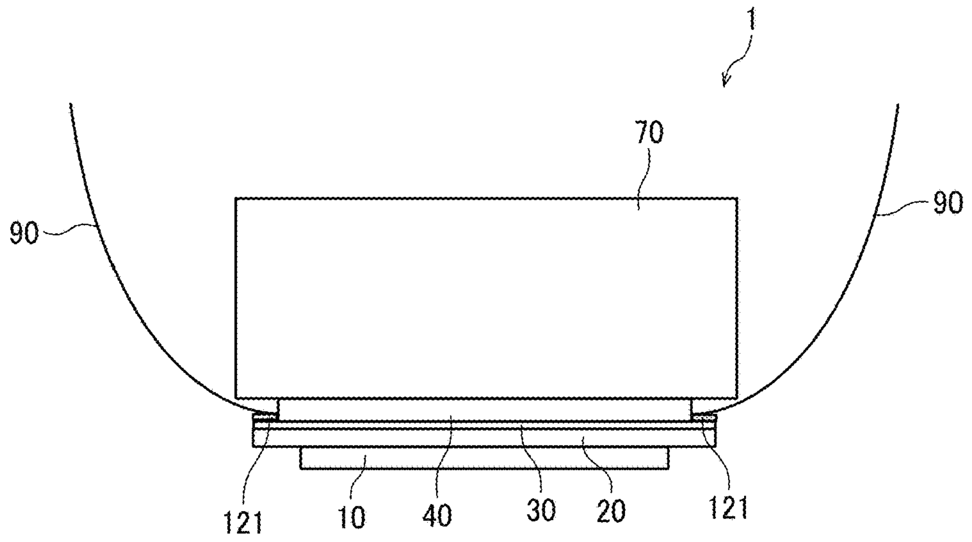
FIG. 2 is an explanatory diagram for a side face of the head.

FIG. 2 is an explanatory diagram for a side face of the head.

Figure 3:
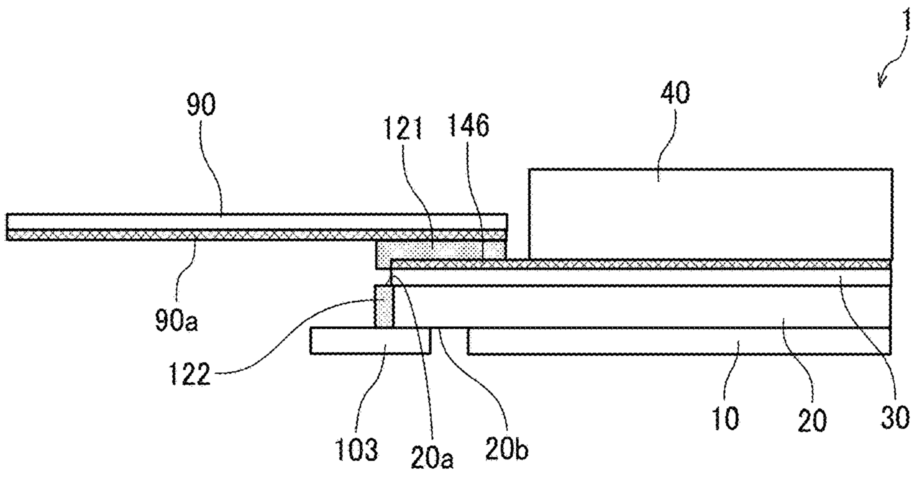
FIG. 3 is an explanatory diagram in which the relevant part of the head is enlarged.

FIG. 3 is an explanatory diagram in which the relevant part of the head is enlarged.

The head 1 includes a nozzle plate 10 in which a nozzle that discharges liquid is formed, an individual channel plate 20 in which a pressure chamber or the like communicating with the nozzle is formed, a diaphragm plate 30 with which a deformable wall surface of the pressure chamber is formed, a piezoelectric element 40 provided in the diaphragm plate 30, and a common channel member 70 that supplies liquid for the pressure chamber or the like.

Here, the individual channel plate 20 is formed with a silicon substrate. The diaphragm plate 30 is formed of silicon oxide (SiO2) and is an insulating film formed on the individual channel plate 20 which is a silicon substrate. Thus, the individual channel plate 20 is also referred to as the "silicon substrate". The diaphragm plate 30 is also referred to as the "insulating film".

On the diaphragm plate 30 which is an insulating film, the electrode wiring 146 that is connected to the lower electrode of the piezoelectric element 40 is formed. Further, the electrode wiring 146 is bonded to the wiring 90*a* of the flexible wiring 90 with an anisotropic conductive film 121, which is a conductive film, to be electrically connected. The anisotropic conductive film 121 is also referred to as "ACF" or the "conductive film".

On the surface where the insulating film (diaphragm plate 30) is provided on the individual channel plate 20 which is a silicon substrate, a silicon exposed area 20*a* where the insulating film (diaphragm plate 30) is not provided exists around the area where the flexible wiring 90 and the electrode wiring 146 are bonded via the ACF 121. The silicon exposed area 20*a* is also simply referred to as an "exposed area". The silicon exposed area 20*a* is provided at an end of the individual channel plate 20, which is a silicon substrate.

The ACF 121 (conductive film) electrically connects the flexible wiring 90 and the electrode wiring 146 in a bonding area, and individual channel plate 20 (silicon substrate) has the silicon exposed area 20*a* on a surface of the individual channel plate 20 (silicon substrate) facing the insulating film (diaphragm plate 30). The silicon exposed area 20*a* is in a vicinity of the bonding area and is exposed from the insulating film (diaphragm plate 30).

In the present embodiment, the silicon exposed area 20*a* is formed with the dicing line 122 for dividing the Si wafer, in which components such as multiple individual channel plates 20 and the diaphragm plates 30 are formed, into individual components. No diaphragm plate 30 is formed in the dicing line 122.

Further, the cover member 103 that serves as a nozzle cover is bonded to the bonding surface 20*b* on the nozzle plate 10 side of the individual channel plate 20.

Next, the functions of the present embodiment are explained with reference to FIG. 4 and FIG. 5.

Figure 4:
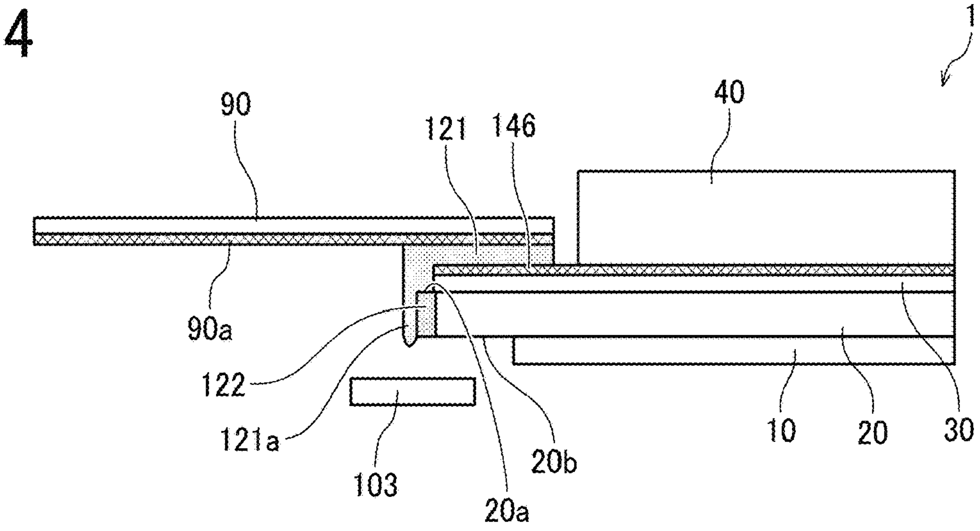
FIG. 4 is an explanatory diagram in which the relevant part is enlarged, which is to be provided for explanation of the functions of the embodiment.

FIG. 4 is an explanatory diagram for a cross section in which the relevant part is enlarged, which is to be provided for explanation of the functions of the embodiment.

Figure 5:
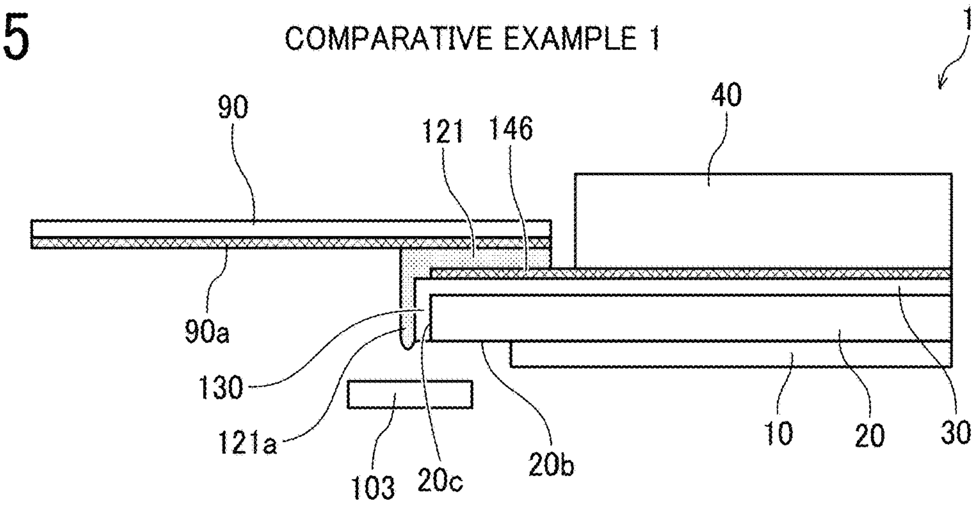
FIG. 5 is an explanatory diagram in which the relevant part of Comparative Example 1 is enlarged.

FIG. 5 is an explanatory diagram for a cross section in which the relevant part of Comparative Example 1 is enlarged.

At the time of bonding the flexible wiring 90 to the electrode wiring 146 with the ACF 121, the ACF 121 is widened by the pressure bonding. Here, if the widened ACF 121 protrudes beyond the end surface of the individual channel plate 20 up to the height of the bonding surface of the nozzle plate 10 as illustrated in FIG. 4, the protrusion part 121*a* of the ACF 121 interferes the cover member 103 at the time of bonding the cover member 103 to the bonding surface 20*b* of the individual channel plate 20, which results in a poor bonding of the cover member 103.

Therefore, whether the protrusion part 121*a* of the ACF 121 protrudes beyond the bonding surface 20*b* of the cover member 103 of the individual channel plate 20 has to be checked.

In this case, if the entire surface of the bonding surface 20*b* is checked with a microscope or the like to detect any protrusion in the bonding process of the cover member 103, there will be many steps.

Thus, in the present embodiment, on the individual channel plate 20 which is a silicon substrate, the silicon exposed area 20*a* where the insulating film (diaphragm plate 30) is not provided is formed around the area where the flexible wiring 90 and the electrode wiring 146 are bonded with the ACF 121.

Accordingly, since a current leakage occurs if the ACF 121 seeps onto the silicon exposed area 20*a*, it is possible to detect the seeping of the ACF 121 by detecting the presence or absence of the current leakage without checking the external appearance.

Here, since the silicon exposed area 20*a* is provided at an end of the individual channel plate 20 which is a silicon substrate, it is possible to detect and eliminate the current leakage at the stage before the ACF 121 starts to seep onto the end surface of the individual channel plate 20, and thus a poor bonding of the cover member 103 is prevented.

In contrast, in Comparative Example 1 illustrated in FIG. 5, the insulating film 130 with which the diaphragm plate 30 is formed is formed up to the end surface 20*c* of the individual channel plate 20 which is a silicon substrate.

Therefore, even if the ACF121 protrudes, the individual channel plate 20 and the ACF 121 do not conduct, and thus the protrusion of the ACF 121 may not be detected with a current leakage or the like. Therefore, the amount of protrusion of the ACF 121 has to be quantitatively checked.

Next, the second embodiment of the present disclosure is explained with reference to FIG. 6.

Figure 6:
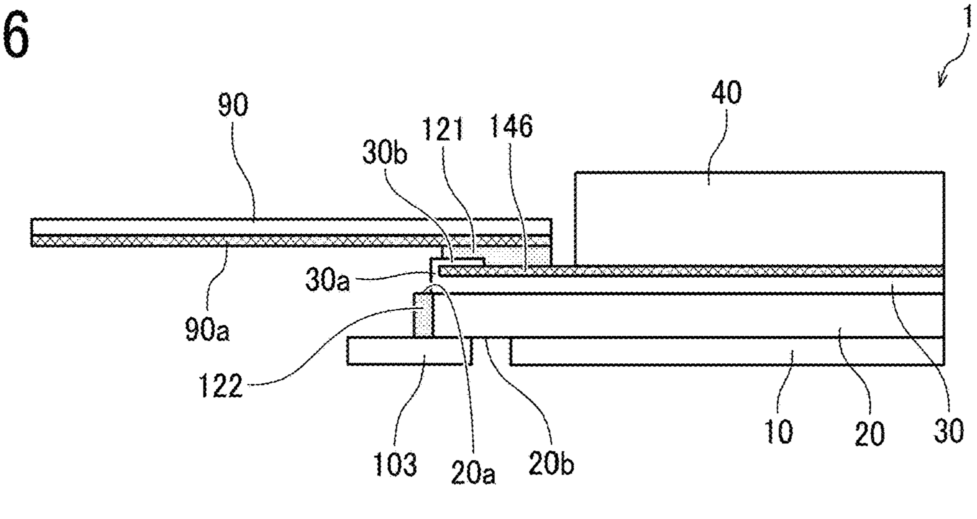
FIG. 6 is an explanatory diagram in which the relevant part of the head according to the second embodiment of the present disclosure is enlarged.

As with FIG. 3, FIG. 6 is an explanatory diagram for a cross section in which the relevant part of the head according to the embodiment is enlarged.

In the present embodiment, the rising part 30*a*, which is formed by raising a part of the insulating film that forms the diaphragm plate 30 toward the electrode wiring 146 at the end surface of the electrode wiring 146, is provided. Further, the folding part 30*b* that covers a part of the surface of the electrode wiring 146 is also provided integrally with the rising part 30*a*.

Accordingly, the protrusion itself of the ACF 121 is reduced.

Next, the third embodiment of the present disclosure is explained with reference to FIG. 7 through FIG. 10.

Figure 7:
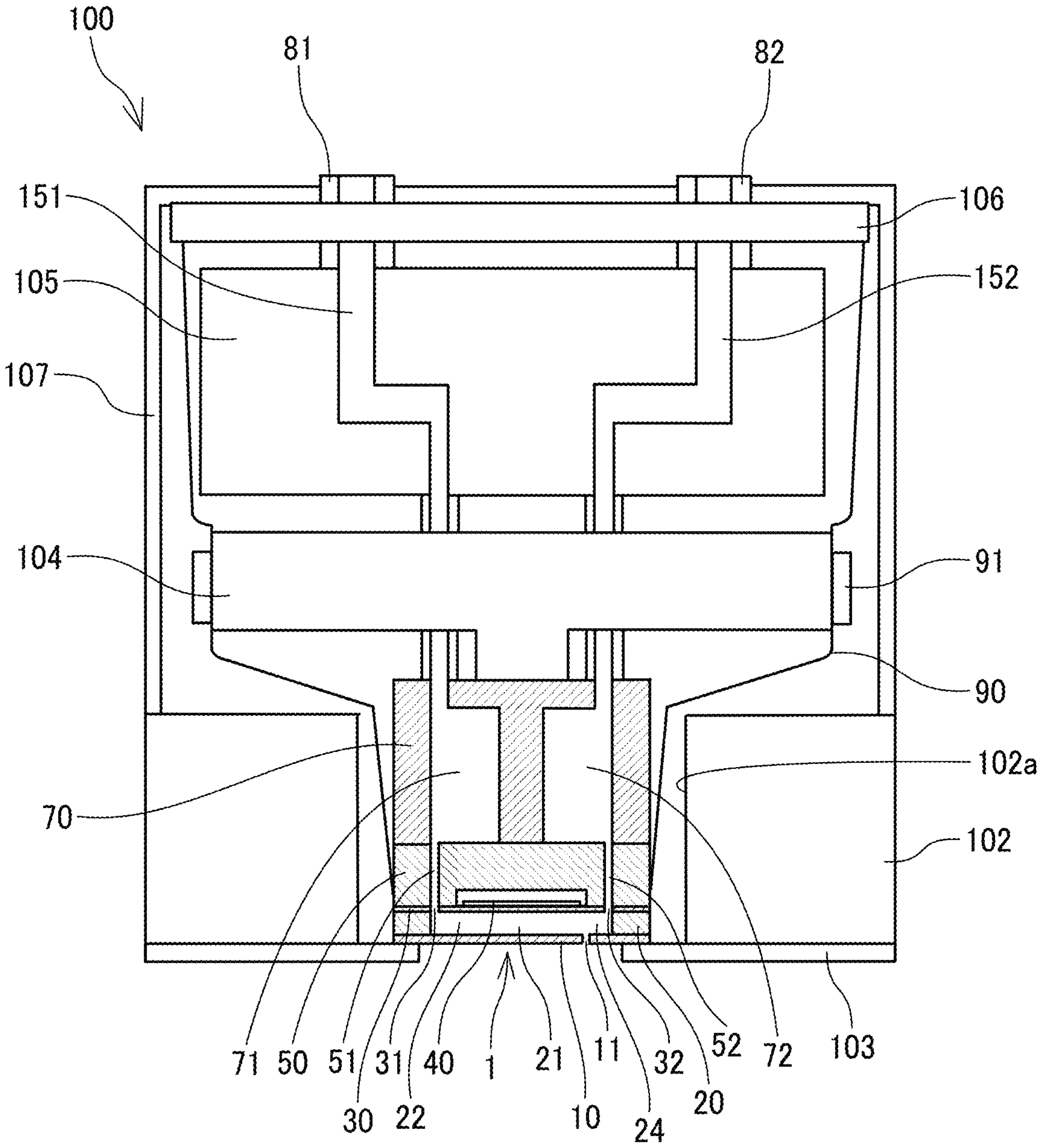
FIG. 7 is an explanatory diagram for a cross section of the head module according to the third embodiment of the present disclosure along the lateral direction of the head.

FIG. 7 is an explanatory diagram for a cross section of the head module according to the embodiment along the lateral direction of the head.

Figure 8:
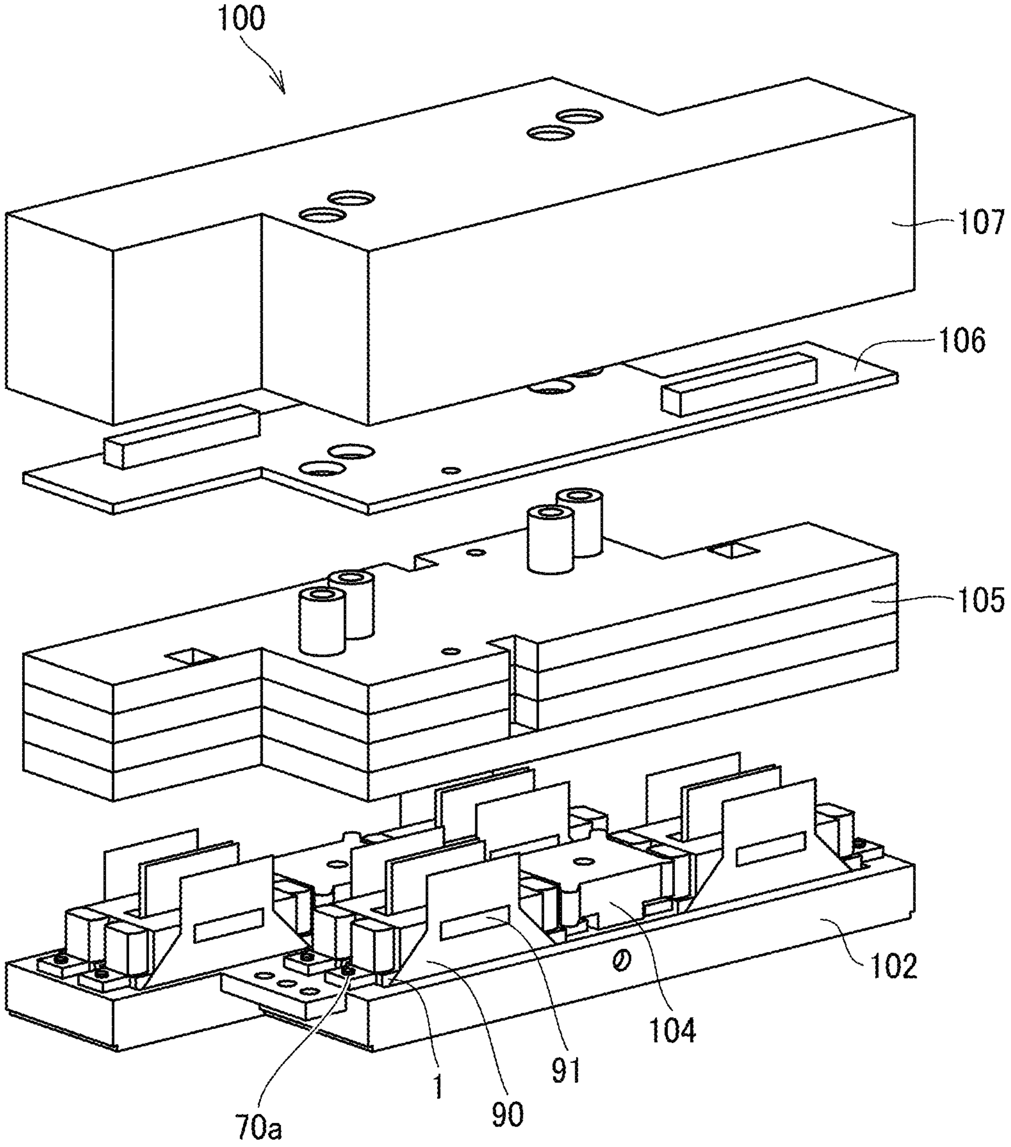
FIG. 8 is an explanatory diagram for an exploded perspective view of the head module.
Figure 9:
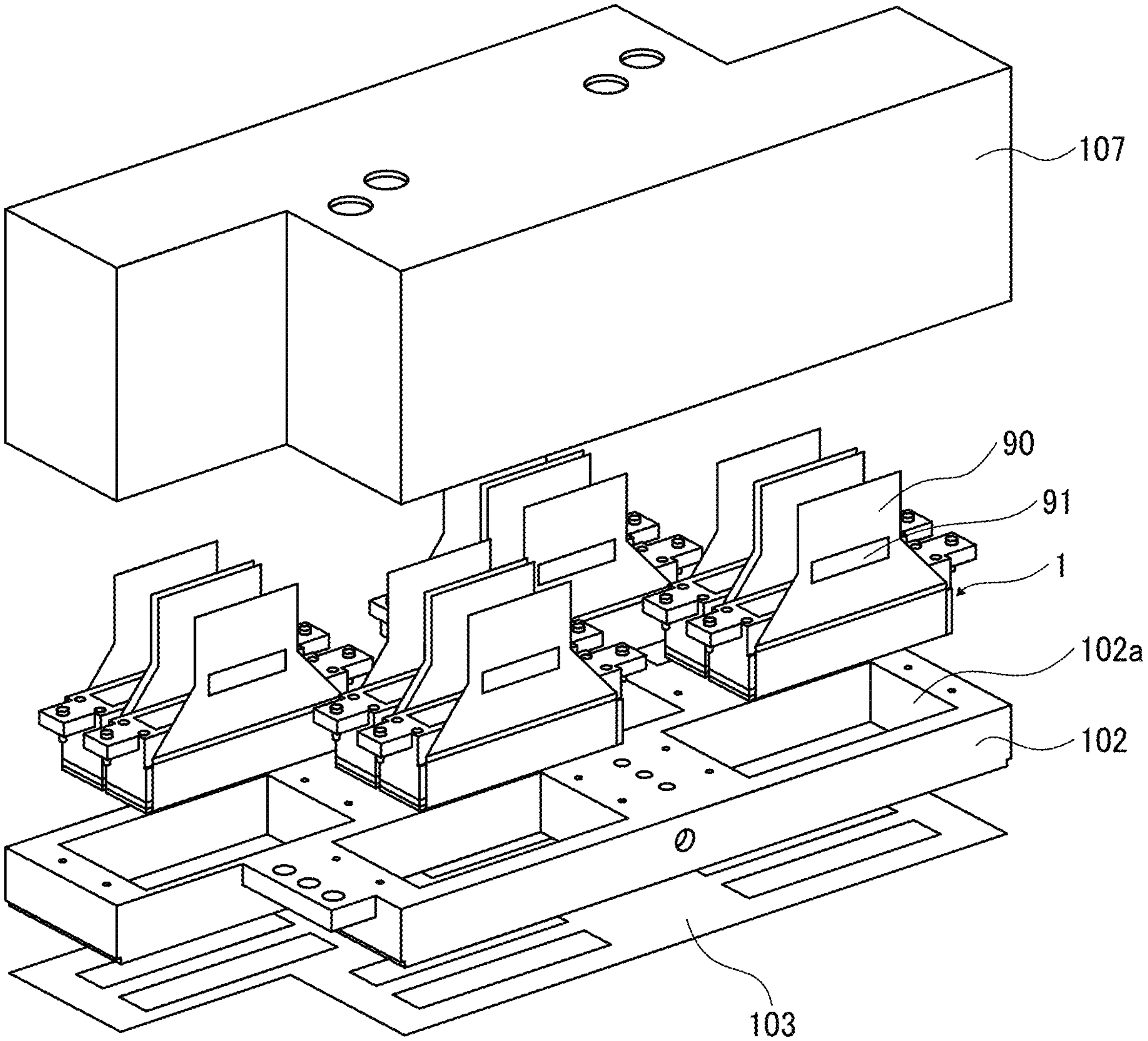
FIG. 9 is an explanatory diagram for an exploded perspective view of the head module.

FIG. 8 and FIG. 9 are explanatory diagrams for exploded perspective views of the head module.

Figure 10:
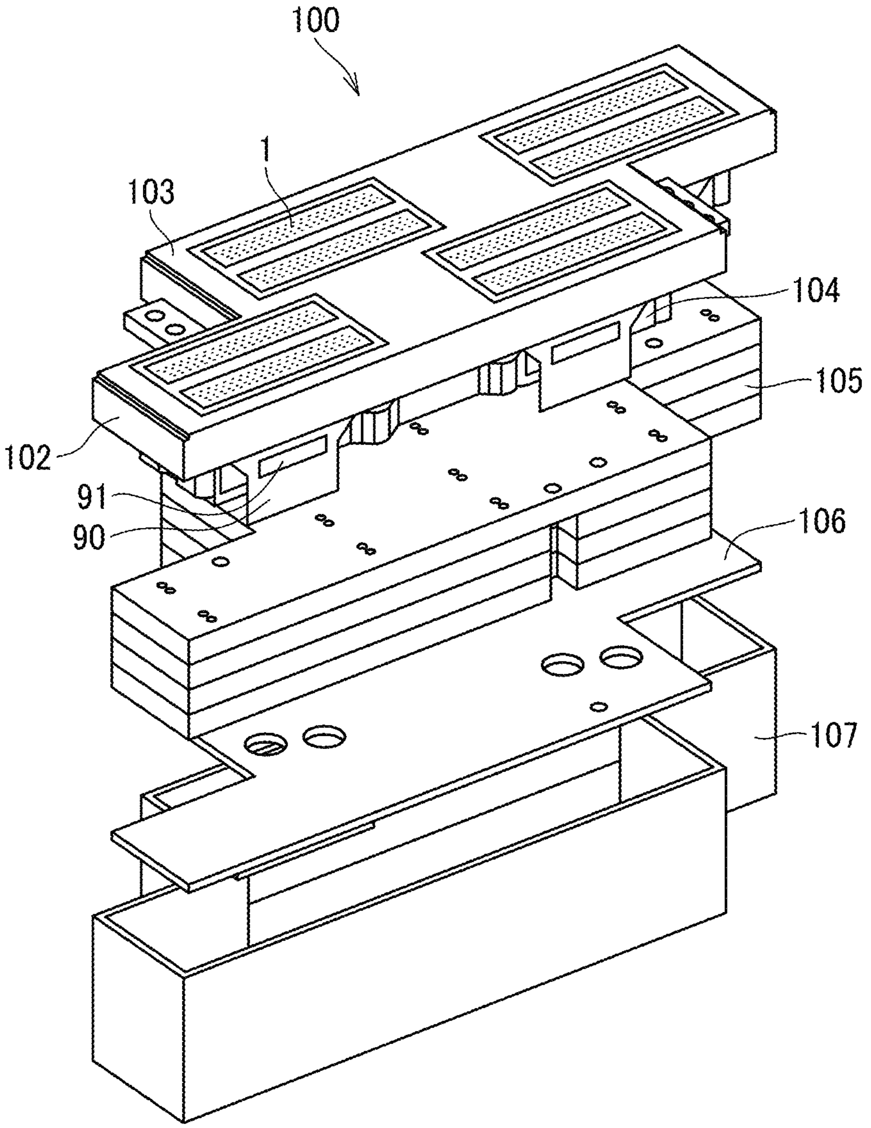
FIG. 10 is an explanatory diagram for an exploded perspective view from the nozzle surface side of the head module.

FIG. 10 is an explanatory diagram for an exploded perspective view from the nozzle surface side of the head module.

The head module 100 includes the multiple heads 1 which are liquid discharge heads that discharge liquid, the base member 102, the nozzle cover member 103 which is a nozzle cover, the heat-radiation member 104, the manifold 105, the printed circuit board 106 (PCB), and the module case 107.

The heads 1 are circulation type heads, which include the nozzle plate 10 in which the nozzle 11 is formed, the individual channel plate 20 formed with the pressure chamber 21 leading to the nozzle 11, etc., the diaphragm plate 30 including the piezoelectric element 40, the intermediate channel plate 50 stacked on the diaphragm plate 30, the common channel member 70 stacked on the intermediate channel plate 50, etc.

Together with the pressure chamber 21, the individual channel plate 20 forms the supply side individual channel 22 leading to the pressure chamber 21 and the collection side individual channel 24 leading to the pressure chamber 21.

The intermediate channel plate 50 forms the supply side intermediate individual channel 51 leading to the supply side individual channel 22 via the opening 31 of the diaphragm plate 30 and the collection side intermediate individual channel 52 leading to the collection side individual channel 24 via the opening 32 of the diaphragm plate 30.

The common channel member 70 forms the supply side common channel 71 leading to the supply side intermediate individual channel 51 and the collection side common channel 72 leading to the collection side intermediate individual channel 52. The supply side common channel 71 leads to the supply port 81 via the channel 151 of the manifold 105. The collection side common channel 72 leads to the collection port 82 via the channel 152 of the manifold 105.

The printed circuit board 106 and the piezoelectric element 40 are connected via the flexible wiring 90, and a driver integrated circuit 91 (driver IC) is mounted on the flexible wiring 90. The driver IC 91 is also referred to as a drive circuit. The driver IC 91 is thermally coupled to the heat-radiation member 104.

The head 1 is inserted to the opening part 102*a* formed in the base member 102 and is fixed by bonding the peripheral end of the individual channel plate 20 to the cover member 103, which is bonded and fixed to the base member 102. Further, the attaching parts 70*a* formed in the common channel member 70 arc fixed to the base member 102 with screws.

In this head 1, as with the above-described first embodiment or second embodiment, the flexible wiring 90 and a wiring electrode that is pulled out from the piezoelectric element 40 are bonded and connected with an ACF. Further, on the surface where the diaphragm plate 30 (insulating film) is provided on the individual channel plate 20 formed with a silicon substrate, the silicon exposed area where the insulating film is not provided exists around the area where the flexible wiring 90 and the electrode wiring are bonded via the ACF.

Next, an example of the apparatus that discharges liquid according to the present embodiments is explained with reference to FIG. 11 and FIG. 12.

Figure 11:
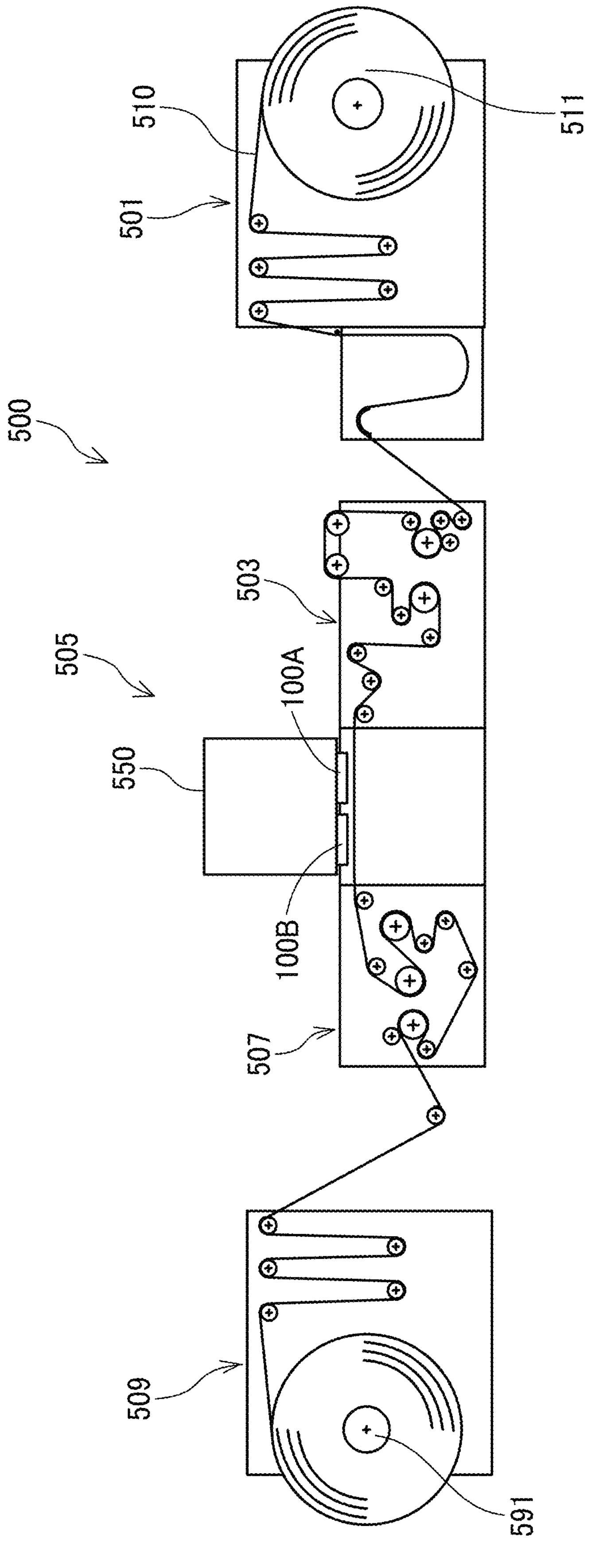
FIG. 11 is a schematic explanatory diagram of an example of the apparatus that discharges liquid according to the present embodiments.

FIG. 11 is a schematic explanatory diagram of the apparatus.

Figure 12:
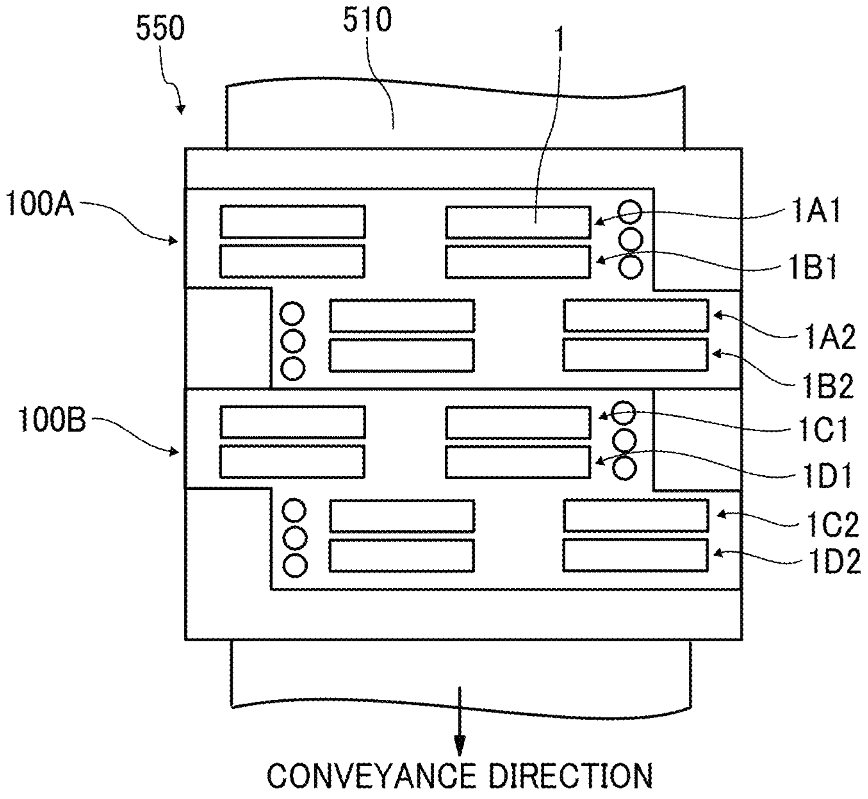
FIG. 12 is a planar explanatory diagram of an example of a discharge unit of the apparatus.

FIG. 12 is a planar explanatory diagram of an example of a discharge unit of the apparatus.

The printing apparatus 500 is a liquid discharge apparatus that discharges a liquid. The printing apparatus 500 includes the installation unit 501 that installs the continuous body 510, the guide/conveyance unit 503 that guides and conveys the continuous body 510 to the printing unit 505, such as continuous paper or a continuous sheet provided by the installation unit 501, the printing unit 505 that performs printing by discharging liquid to the continuous body 510 to form an image, the drying unit 507 that dries the continuous body 510, the ejection unit 509 that ejects the continuous body 510, etc.

The continuous body 510 is fed from the wound roller 511 of the installation unit 501, guided and conveyed by the respective rollers of the installation unit 501, the guide/conveyance unit 503, the drying unit 507, and the ejection unit 509, and wounded by the winder roller 591 of the ejection unit 509.

In the printing unit 505, this continuous body 510 is conveyed in such a manner facing the discharge unit 550, so that an image is printed with the liquid discharged from the discharge unit 550.

As illustrated in FIG. 12, the discharge unit 550 includes the two head modules explained in the above-described third embodiment, i.e., the head module 100A and head module 100B, in the common holding member 300.

Note that, with respect to the head arrangement direction, which is the direction in which the heads 1 are arranged in the head modules 100 and is the direction perpendicular to the conveyance direction, the head rows 1A1 and 1A2 of the head module 100A discharge liquid of the same color. Similarly, the head rows 1B1 and 1B2 of the head module 100A are paired, the head rows 1C1 and 1C2 of the head module 100B are paired, and the head rows 1D1 and 1D2 are paired, to discharge liquid of the respective colors as desired.

Note that the head modules according to the present embodiments can be integrated with functional components and mechanisms, to configure the liquid discharge unit. For example, the head modules can be combined with at least one of a head tank, carriage, supply mechanism, maintenance/recovery mechanism, main-scanning movement mechanism, and configurations of a liquid circulation apparatus.

Here, the term "integrate" includes, for example, that a head module and functional components or mechanisms are fastened, bonded, engaged, etc., to be fixed to each other or so that one is held with the other in a movable manner. Further, the head module and the functional components or mechanisms may be configured to be removable from each other.

Further, the "apparatus that discharges liquid" in the present embodiments includes an apparatus including a head, head module, or liquid discharge unit, to discharge liquid by driving the liquid discharge head.

The apparatus that discharges liquid includes, not only an apparatus that can discharge liquid to an object to which liquid can be attached, but also an apparatus that discharges liquid into gas or liquid.

The "apparatus that discharges liquid" can include a means relating to the feeding, conveying, and ejecting of an object to which liquid can be attached, and, moreover, a pre-processing apparatus, a post-processing apparatus, and the like.

For example, the "apparatus that discharges liquid" may be an image forming apparatus, which is an apparatus that discharges ink to form an image on a sheet, or a stereoscopic modeling apparatus (three-dimensional modeling apparatus) that discharges a modeling liquid onto a powdery material layer, which is formed by layering powdery material, in order to produce a stereoscopic modeled object (three-dimensional modeled object).

Further, the "apparatus that discharges liquid" is not limited to an apparatus that discharges liquid for visualizing meaningful images such as letters and figures. For example, an apparatus that forms a pattern and the like that does not have meaning by itself and an apparatus that produces a three-dimensional model are included.

The above-mentioned "object to which liquid can be attached" is indicative of an object to which liquid can be attached at least temporarily, an object to which liquid can be attached and fixed, an object to which liquid can be attached and permeate, etc. Unless otherwise specified, anything that liquid can be attached to is included, and specific examples include media to be recorded such as sheets, record paper, record sheets, films, and cloths, electronic components such as electronic substrates and piezoelectric elements, and other media such as powdery material layers (powder layers), organ models, and cells for inspection.

The material of the aforementioned "object to which liquid can be attached" may be anything to which liquid can be attached at least temporarily, such as paper, yarn, fiber, fabric, leather, metals, plastics, glass, wood, and ceramics.

Further, although the "apparatus that discharges liquid" is an apparatus in which the liquid discharge head moves relative to the object to which liquid can be attached, there is not a limitation as such. Specific examples include a serial type apparatus which moves the liquid discharge head, a line type apparatus which does not move the liquid discharge head, etc.

Further, in addition, the "apparatus that discharges liquid" may be a processing liquid applying apparatus that discharges a processing liquid onto a sheet in order to apply the processing liquid onto the sheet surface for a purpose of improving the quality of the sheet surface, etc., a spray granulation apparatus that sprays a composition liquid having raw materials dispersed inside of the liquid through a nozzle to granulate fine particles of the raw material, etc.

Although the liquid to be discharged is not limited in particular and can be anything that has a viscosity and a surface tension suitable for being discharged from the head, it is preferable to use a liquid whose viscosity becomes 30 mPa·s or less by heating or cooling under a normal temperature and normal pressure. More specifically, the liquid may be a solution, a suspension, an emulsion, or the like including a solvent such as water or an organic solvent, a colorant such as a dye or a pigment, a functionalization material such as a polymerizable compound, a resin, or a surfactant, a biocompatible material such as DNA, amino acid, protein, or calcium, an edible material such as a natural colorant, etc., and, for example, these can be used for the purposes of an inkjet ink, a surface treatment solution, a liquid for forming a constituent element of an electronic element or a light-emitting element or a resist pattern of an electronic circuit, or a material solution for three-dimensional modeling.

The energy generating source for discharging liquid includes ones using a piezoelectric actuator (laminated type piezoelectric element or thin film type piezoelectric element), a thermal actuator which uses an electricity-heat conversion element such as a heating resistor, an electrostatic actuator configured with a diaphragm plate and counter electrodes, etc.

Note that, among the terms of the present application, terms such as image forming, recording, letter printing, photo printing, printing, and modeling are synonyms. According to the present embodiments, a protrusion of a conductive film can be easily detected.

[Aspect 1]

A head (1) includes: a silicon substrate (20); an insulating film (30) on the silicon substrate (20); an electrode wiring (146) on the insulating film (30); a flexible wiring (90) connected to the electrode wiring (146); and a conductive film (121) electrically connects the flexible wiring (90) and the electrode wiring (146) in a bonding area. The silicon substrate (20) has an exposed area (20*a*) on a surface of the silicon substrate (20) facing the insulating film (30), and the exposed area (20*a*) is in a vicinity of the bonding area and is exposed from the insulating film (30).

[Aspect 2]

In the head (1) according to Aspect 1, the exposed area (20*a*) is at an end of the silicon substrate (20) closed to the flexible wiring (90).

[Aspect 3]

In the head (1) according to Aspect 1, the insulating film (30) has a rising part (30*a*) rising toward the electrode wiring (146) at an end surface of the electrode wiring (146).

[Aspect 4]

In the head (1) according to Aspect 3, the insulating film (30) further has a folding part (30*b*) connected to the rising part (30*a*) to cover a part of surface of the electrode wiring (146).

[Aspect 5]

In a head module (100) comprising the head (1) according to Aspect 1, the head (1) includes multiple heads (1).

[Aspect 6]

A liquid discharge apparatus (500) includes the head module (100) according to Aspect 5, wherein the head (1) discharges a liquid.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A head comprising:

a silicon substrate;

an insulating film on the silicon substrate;

an electrode wiring on the insulating film;

a flexible wiring including a flexible substrate and a wiring on the flexible substrate, wherein the wiring is connected to the electrode wiring; and a conductive film electrically connects the flexible wiring and the electrode wiring in a bonding area, wherein the silicon substrate has an exposed area on a surface of the silicon substrate facing the insulating film, and the exposed area is in a vicinity of the bonding area and is exposed from the insulating film, in a plan view, the exposed area surrounds the insulating film.

2. The head according to claim 1, wherein the exposed area is at an end of the silicon substrate closed to the flexible wiring.

3. The head according to claim 1, wherein the exposed area is at a periphery edge of the surface of the silicon substrate facing the insulating film, the exposed area surrounding the insulating film.

4. The head according to claim 1, wherein the insulating film has a rising part rising toward the electrode wiring at an end surface of the electrode wiring.

5. The head according to claim 4, wherein the insulating film further has a folding part connected to the rising part to cover a part of surface of the electrode wiring.

6. The head according to claim 1, wherein the conductive film comprises an anisotropic conductive film.

7. The head according to claim 1, wherein the conductive film is disposed between the flexible substrate and the silicon substrate.

8. The head according to claim 1, wherein the conductive film consists essentially of an anisotropic conductive film.

9. A head module comprising the head according to claim 1, wherein the head includes multiple heads.

10. A liquid discharge apparatus comprising the head module according to claim 9, wherein the head discharges a liquid.

* * * * *